US012751450B2

(12) United States Patent
Vesper

(10) Patent No.: US 12,751,450 B2
(45) Date of Patent: Oct. 6, 2026

(54) CYANOBACTERIA SUPPRESSION COMPOSITION AND METHOD OF USE

(71) Applicant: U.S. Environmental Protection Agency, Washington, DC (US)

(72) Inventor: Stephen Joseph Vesper, Cincinnati, OH (US)

(73) Assignee: U.S. Environmental Protection Agency, Washington, DC (US)

( * ) Notice: Subject to any disclaimer, the term of this patent is extended or adjusted under 35 U.S.C. 154(b) by 519 days.

(21) Appl. No.: 18/119,991

(22) Filed: Mar. 10, 2023

(65) Prior Publication Data

US 2024/0298640 A1 Sep. 12, 2024

(51) Int. Cl.
*A01N 43/16* (2006.01)
*A01N 25/12* (2006.01)
*A01P 1/00* (2006.01)

(52) U.S. Cl.
CPC ............. *A01N 43/16* (2013.01); *A01N 25/12* (2013.01); *A01P 1/00* (2021.08)

(58) Field of Classification Search
None
See application file for complete search history.

(56) References Cited

U.S. PATENT DOCUMENTS

| | | | | |
|---|---|---|---|---|
| RE37,890 | E * | 10/2002 | Levy | A01N 49/00 424/407 |
| 7,758,752 | B2 | 7/2010 | Pan et al. | |
| 10,729,138 | B2 | 8/2020 | Braun et al. | |
| 10,822,258 | B2 | 11/2020 | Cao et al. | |
| 11,019,823 | B2 | 6/2021 | Braun et al. | |
| 11,154,053 | B2 | 10/2021 | Harel et al. | |
| 11,192,830 | B2 | 12/2021 | Shirley, Jr. et al. | |
| 11,439,150 | B2 | 9/2022 | John et al. | |
| 11,440,856 | B2 | 9/2022 | Owusu-Adom et al. | |
| 2001/0024828 | A1 * | 9/2001 | Maekawa | C12N 11/084 435/395 |

FOREIGN PATENT DOCUMENTS

CN 104003784 A * 8/2014

OTHER PUBLICATIONS

Amorim. (2021). Ecological impacts of freshwater algal blooms on water quality, plankton biodiversity, structure and ecosystem functioning. Sci. Total Environ, 758, 143605.
Asgodom et al. (2021). Effect of the near-infrared activated photocatalyst Cu(2)(OH)PO(4) nanoparticles on the growth of harmful algal blooms causing Microcystis aeruginosa. Environ. Sci. Pollut. Res. Int. 28 (16), 20762-20771.
Buley et al. (2021). Field evaluation of seven products to control cyanobacterial blooms in aquaculture. Environ. Sci. Pollut. Res., 29971-29983.
Carmichael. (2001). Health effects of toxin-producing cyanobacteria: The CyanoHABS. Hum. Ecol. Risk Assess, 7 (5), 1393-1407.
Chen et al. (2021). Using hydrogen peroxide to control cyanobacterial blooms: A mesocosm study focused on the effects of algal density in Lake Chaohu, China. Environ. Pollut. 272, 115923.
Kinley-Baird, et al. (2021). Laboratory-scale evaluation of algaecide effectiveness for control of microcystin-producing cyanobacteria from Lake Okeechobee, Florida (USA). Ecotoxicol Environ Saf., 207, 11233.
VandKhanghah et al. (2022). Biomagnification of copper along the aquatic food chain (*Artemia franciscana, Danio rerio*, and *Astronotus ocellatus*). Biol. Trace Elem. Res., 200, 1854-1860.
Mucci et al. (2020). Health risk assessment related to hydrogen peroxide presence in the workplace atmosphere—analytical methods evaluation for an innovative monitoring protocol. Int. J. Occup Med. Environ. Health. 2020, 33(2), 137-150.
Olson et al. (2020). Harmful algal bloom toxins in aerosol generated from inland lake water. Environ. Sci. Techno, 54 (8), 4769-4780.
Vesper et al. (2022). Prophylactic addition of glucose suppresses cyanobacterial abundance in lake water. Life, 12, 385.

* cited by examiner

*Primary Examiner* — Michelle F. Paguio Frising
(74) *Attorney, Agent, or Firm* — Caesar Rivise, PC

(57) ABSTRACT

A cyanobacteria suppression composition includes: (a) a porous body including a plurality of pores; and (b) a growth promoting agent loaded into the pores of the porous body, wherein the growth promoting agent is effective to promote growth of microorganisms that compete with cyanobacteria for resources so as to be effective to suppress growth of the cyanobacteria. A method of preparing the composition and a method of using the composition to prevent harmful cyanobacterial blooms are also disclosed.

6 Claims, 4 Drawing Sheets

CYANOBACTERIA SUPPRESSION COMPOSITION AND METHOD OF USE

STATEMENT REGARDING FEDERALLY SPONSORED RESEARCH OR DEVELOPMENT

This invention was made with government support under Case No. 40008-23 of the Environmental Protection Agency. The government has certain rights in the invention.

BACKGROUND OF THE INVENTION

1. Field of Invention

This invention relates to suppression of harmful algal blooms and harmful cyanobacterial blooms as well as the toxins these blooms produce.

2. Description of Related Art

Harmful algal blooms (HABs), also called harmful cyanobacterial blooms (HCBs), are characterized by abundant growth of cyanobacteria, otherwise known as blue-green algae, resulting from the addition of high levels of nitrogen and phosphorous compounds into rivers, lakes, ponds, estuaries, oceans, and other bodies of water. This is often the result of agricultural run-off or domestic or industrial inputs into the water. Under the summer weather conditions of warmer temperatures and prolonged sunlight, cyanobacteria can flourish in these impacted waters.

Cyanobacteria produce toxins which are detrimental for aquatic life and organisms that contact or consume the water, including people, pets, birds, and wildlife. In large enough quantities, these toxins contaminate the drinking water of communities that draw their water from sources experiencing HABs/HCBs. For example, Toledo, Ohio obtains its drinking water from Lake Erie, and Lake Erie experienced a significant HAB/HCB in the summer of 2014, causing high levels of toxins in the drinking water. As a result, half of a million people were unable to drink or use their tap water.

Current HABs/HCB control measures involve the addition of an algaecide once the bloom has developed. Many HAB/HCB control agents can kill cyanobacteria, but these algaecides are toxic and dangerous to handle. Algaecides usually contain hydrogen peroxide, often combined with an acid such as peroxyacetic acid, or the algaecide is a formulation of copper (Cu). [1]-[4]. Hydrogen peroxide is toxic at high concentrations and is a strong oxidizer, which makes it dangerous to handle and indiscriminate in its action. [5] Copper is a toxic metal that can bioaccumulate in freshwater ecosystems [6]. Further, in current processes of killing cyanobacteria, there is a high risk of toxins in the killed or lysed cells being released into the environment, providing additional danger to the surrounding ecosystem.

HABs/HCBs and the toxins they produce are a threat to drinking, recreational-water safety, and the aquatic ecosystem. [8]-[9] To prevent HABs/HCBs as a long-term solution, it is necessary to limit the introduction of high concentrations of fixed nitrogen compounds and phosphates in impacted waters. [10] As an immediate solution, however, agents or methods are needed that can limit the production of cyanotoxins at the source. Therefore, to protect human and environmental health, solutions are needed to address HABs/HCBs.

All references cited herein are incorporated herein by reference in their entireties.

BRIEF SUMMARY OF THE INVENTION

Accordingly, a first aspect of the invention comprises a cyanobacteria suppression composition comprising:

a porous body comprising a plurality of pores; and a growth promoting agent loaded into the pores of the porous body, wherein the growth promoting agent is effective to promote growth of microorganisms that compete with cyanobacteria for resources so as to be effective to suppress growth of the cyanobacteria.

In certain embodiments, the porous body is buoyant in water.

In certain embodiments, the cyanobacteria suppression composition further comprises a biodegradable coating at least partially surrounding an exterior surface of the porous body, wherein the biodegradable coating is effective to delay a release of the growth promoting agent from the porous body upon exposure to water.

In certain embodiments, the porous body comprises a natural material selected from the group consisting of a pumice stone, wood chips and a sponge.

In certain embodiments, the growth promoting agent is non-toxic and occupies less than 100% of a total volume of the pores of the porous body.

In certain embodiments, the growth promoting agent is a carbohydrate.

In certain embodiments, the growth promoting agent is a carbohydrate selected from the group consisting of glucose, fructose and sucrose.

In certain embodiments, the biodegradable coating is a plant-based wax or a beeswax.

A second aspect of the invention is a method of preparing the cyanobacteria suppression composition of the invention, said method comprising: (a) providing the porous body; (b) providing a solution comprising the growth promoting agent; (c) immersing at least a portion of the porous body into the solution; (d) allowing the pores of the porous body to absorb an amount of the solution; and (e) drying the porous body containing the growth promoting agent to remove excess moisture.

In certain embodiments of the preparation method, the solution is prepared by adding 0.5 g of growth promoting agent per ml of water.

In certain embodiments, the preparation method further comprises autoclaving the porous body in the solution between steps (c) and (d), and after the autoclaving, placing the porous body in the solution under a vacuum until the solution ceases bubbling.

In certain embodiments, the preparation method further comprises coating an exterior of the porous body with a biodegradable coating after the drying step, wherein the biodegradable coating is effective to delay a release of the growth promoting agent from the pores of the porous body upon exposure to water.

In certain embodiments of the preparation method, the biodegradable coating is a wax and the coating step further comprises: (i) melting the wax; (ii) applying a coating of the wax over the exterior surface of the porous body; (iii) allowing the coating to dry and solidify; and (iv) optionally repeating steps (ii) and (iii).

In certain embodiments of the preparation method, the growth promoting agent is a carbohydrate selected from the group consisting of glucose, sucrose and fructose.

A third aspect of the invention is a method of suppressing cyanobacterial blooms in a body of water, said method comprising adding to the body of water the cyanobacteria suppression composition of the invention, and floating the cyanobacteria suppression composition in a photosynthetic zone of the body of water to promote the growth of microorganisms competitive with cyanobacteria and to suppress the growth of the cyanobacterial blooms in the body of water.

In certain embodiments of the method of suppressing cyanobacterial blooms, the cyanobacteria suppression composition is buoyant in water and further comprises a biodegradable coating at least partially surrounding an exterior surface of the porous body, wherein the biodegradable coating delays a release of the growth promoting agent from the porous body upon exposure to the body of water.

In certain embodiments, the method of suppressing cyanobacterial blooms further comprises monitoring a cyanobacteria concentration and a growth promoting agent concentration in the body of water and adding additional cyanobacteria suppression compositions to maintain the cyanobacteria concentration below $1\times10^4$ cyanobacteria per ml of water.

In certain embodiments, the method of suppressing cyanobacterial blooms further comprises recovering the cyanobacteria suppression composition from the body of water when the cyanobacteria suppression composition no longer contains the growth promoting agent, cleaning the porous body of the cyanobacteria suppression composition and then reloading the porous body for reuse as a recycled cyanobacteria suppression composition.

In certain embodiments of the method of suppressing cyanobacterial blooms, the growth promoting agent is a carbohydrate selected from the group consisting of glucose, sucrose and fructose.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Glossary

Figure 1:
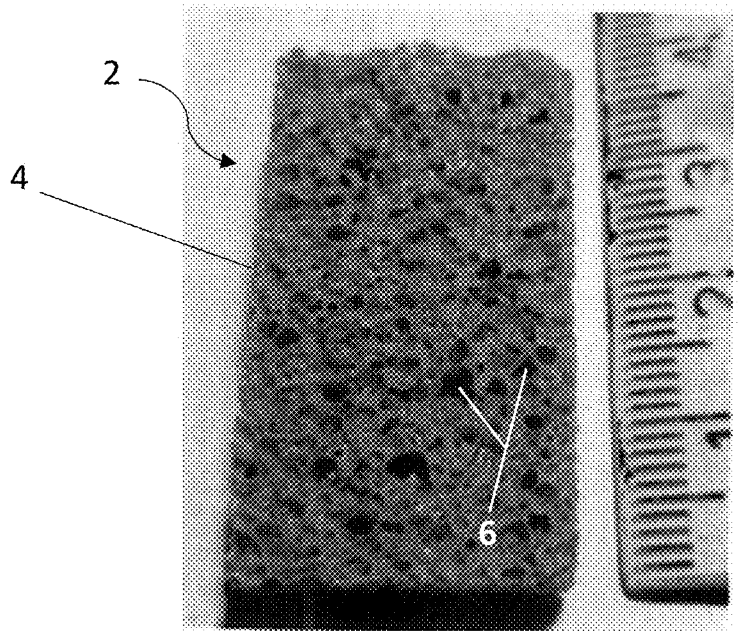
FIG. 1 is a photograph showing an overhead view of an exemplary embodiment of the invention without a sustained release coating.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components and can be selected from the group consisting of two or more of the recited elements or components.

The use of the singular herein includes the plural (and vice versa) unless specifically stated otherwise. In addition, where the use of the term "about" is before a quantitative value, the present teachings also include the specific quantitative value itself, unless specifically stated otherwise.

Statements herein describing a feature as being included in "certain embodiments" of the invention should be understood to mean that the feature may be present in any one embodiment of the invention, all embodiments of the invention, or any combination of two or more embodiments of the invention regardless of whether the "certain embodiments" are introduced in the application before or after such a statement.

It should be understood that the order of steps or order for performing certain actions is immaterial so long as the present teachings remain operable. Moreover, two or more steps or actions can be conducted simultaneously.

The dimensions and values disclosed herein are not to be understood as being strictly limited to the exact numerical values recited. Instead, unless otherwise specified, each such dimension is intended to mean both the recited value and functionally equivalent range surrounding that value. For example, a dimension disclosed as "40 mm" is intended to mean "about 40 mm".

The term "substantially free of" refers to 2% or less of a stated ingredient. "Free of" refers to no detectable amount of the stated ingredient or thing.

As used herein, the terms "a" and "an" mean "at least one".

As used herein, the terms "include", "includes" and "including" are meant to be non-limiting.

All percentages and ratios are calculated by weight unless otherwise indicated and are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Inventive Composition

A first aspect of the invention is a cyanobacteria suppression composition comprising: a porous body comprising a plurality of pores; and a growth promoting agent loaded into the pores of the porous body, wherein the growth promoting agent is effective to promote growth of microorganisms that compete with cyanobacteria for resources so as to be effective to suppress growth of the cyanobacteria. Preferably, the porous body makes the composition buoyant and the porous body is coated with a biodegradable substance effective to delay the release of the growth promoting agent when the composition is in contact with water.

The composition is preferably a floating, non-toxic form of controlled-release suppression agent that allows for the inhibition of HABs/HCBs by placing the agent in the water layer penetrated by light (photosynthetic zone) where the cyanobacteria grow.

The porous body is a material containing pores capable of receiving and selectively retaining liquids within the pores. Non-limiting examples of materials suitable for use as porous bodies include pumice stone, sponge and wood. Although such natural materials are preferred, it is also within the scope of the invention to use artificial materials as the porous body.

Preferably, the porous body is buoyant in water, which as defined herein, means that the porous body will float in distilled water at 20° C. at 1 atm (101,325 pascals). The porous body can be free-floating or tethered to maintain its location. In less preferred embodiments, the porous body is not buoyant, but the cyanobacteria suppression composition includes or is associated with a flotation device.

The growth promoting agent is a substance effective to promote the growth of microorganisms competitive with cyanobacteria. The growth promoting agent is preferably a carbohydrate, and more preferably at least one of glucose, sucrose and/or fructose.

The biodegradable coating comprises a substance that can be digested or decomposed by exposure to water and/or biological organisms in bodies of water susceptible to HABs/HCBs. The biodegradable coating preferably comprises beeswax, soy wax or other plant-derived waxes. The biodegradable coating preferably has hydrophobic (and/or other) properties making it effective to delay a release of the growth promoting agent from pores of the porous body upon exposure to water. The biodegradable coating should decompose over an extended period of time such that the growth promoting agent is released from the pores of the porous body and into the body of water over the extended period of time.

In one preferred formulation, the invention includes only natural products, such as pumice stone, glucose, and a coating agent such as soy wax. These commercial products are inexpensive and readily available in large volumes at commodity prices.

Method of Preparation

An exemplary method of making and using the apparatus includes 1) preparing a saturated solution of growth promoting agent (e.g., glucose) in water; 2) adding at least one porous body, e.g., pumice stone, to the saturated solution in a vacuum vessel and autoclaving the porous body; 3) removing the hot mixture of the at least one porous body and solution from the autoclave, and placing the mixture under vacuum, allowing sufficient time for the air in the porous body to be partially replaced by the saturated solution, but leaving enough air in the porous body to ensure buoyance; 4) recovering the at least one porous body after vacuum treatment and drying in a drying oven to remove water; 5) optionally melting a biodegradable coating material (e.g., soy wax flakes); 6) optionally applying the melted material to coat the surface of the at least one porous body; and 7) optionally repeating step 6 as desired. The melted coating is applied to the surface of the at least one porous body via a method including but not limited to dipping, spraying, brushing, and any other similar procedure that allows the porous body to be coated.

In another exemplary method of preparation, the cyanobacteria suppression composition is prepared by placing at least one pumice stone (and/or other porous bodies) in a saturated solution of growth promoting agent, e.g., of hot glucose, under vacuum. In certain examples, the saturated solution of growth promoting agent is prepared by adding half a weight of growth promoting agent, for example 20 g of glucose, to a weight of water, for example 40 ml of water (i.e., adding 0.5 g of growth promoting agent per ml of water). This process removes some of the air in the pumice stone and replaces it with the glucose solution. The amount of glucose-loaded into the pumice stones is an important factor in the performance of the composition to suppress cyanobacteria growth. For example, replacing too much air with growth promoting agent may hinder the buoyancy of the porous body. This is important because the composition must remain near the surface of the body of water (in the photosynthetic zone), where the cyanobacteria live. The cyanobacteria suppression composition floats within the photosynthetic zone and feeds the competing microorganisms in that zone over an extended period of time.

To control the release of the glucose, the glucose-loaded pumice stones are optionally coated with a biodegradable coating, e.g., soy wax. This coating can be as thick or thin as needed to achieve the desired rate of release of the glucose. The thicker the coating, the slower carbohydrate releases. However, in some situations where the glucose concentration must be initially high to address sudden blooms, the glucose-loaded pumice stones can be left uncoated by wax, permitting faster release of the glucose.

In embodiments with a wax coating, the wax is melted and applied to the porous body, for example glucose-infused pumice block, until the entire block is coated to the desired thickness.

Method of Use

Most conventional agents used to treat a HAB/HCB are toxic agents designed to kill the cyanobacteria, such as copper sulfate or hydrogen peroxide. In the process of killing the cyanobacteria, cyanotoxins, like microcystin, are released into the water. To avoid this outcome, the present invention suppresses the growth of cyanobacteria by promoting the growth of competing microorganisms. By supplying the growth promoting agent to the body of water being treated, the invention promotes competing, non-toxin producing, heterotrophic bacteria to utilize the nitrogen compounds and phosphates that would otherwise promote cyanobacterial growth leading to HABs/HCBs. Therefore, the cyanobacteria are never able to grow, and the HAB/HCB never forms. With this system, there is no cyanotoxin produced and no residual toxic elements, such as copper, that accumulate in the ecosystem.

The invention is designed to introduce a cyanobacterial suppression agent, e.g., glucose, into the impacted body of water at the time and place needed to suppress the cyanobacterial growth. The cyanobacteria need sufficient sunlight to penetrate the surface water and a water temperature typically about 25-27° C. to grow. In the operation of the invention, when the summer temperature and weather conditions are appropriate and/or when the cyanobacteria are first detected, the cyanobacteria prevention composition of the invention is introduced into the water.

The invention is deployed in the water body of concern individually or in a number needed to control the HAB/HCB. In certain embodiments, the inventive composition is deployed in mesh bags that are anchored to specific locations in the water or attached to nets with flotation members of their own. By monitoring the concentrations of cyanobacteria, toxin, and glucose in the water, the number of units of the invention used can be tailored to the specific need. The cyanobacteria suppression compositions of the invention are left in the water for a predetermined amount of time including but not limited to a week, 20 days, a month, or multiple months.

In preferred embodiments, the porous body is collected after use, cleaned, and reused. However, when all natural materials are used, there is no harm to the environment even if porous bodies are never recovered from the water. For example, pumice stones present no toxic danger because they are a natural volcanic stone. Further, as glucose and soy flake wax are fully biodegradable, they also avoid pollution in the surrounding waters.

Used compositions are preferably collected by skimming the water surface with nets or with a deployable boom. The recovered porous bodies are then cleaned in hot-water or steam and then reused.

Referring to FIG. 1, an exemplary embodiment of a cyanobacteria suppression composition of the invention is shown. In this nonlimiting example, cyanobacteria suppression composition 2 includes a 1×2×3 cm porous body 4 of pumice stone block including a plurality of pores 6. The exemplary pumice stone in FIG. 1 weighs between 1.6 and 2 grams, but the weight of the porous body in other embodiments might be within a range from, e.g., 0.5 to 500 grams or 1.0 to 100 grams. In certain examples, to produce the cyanobacteria suppression composition 2 of the invention, the pumice stone is added to a saturated glucose solution, e.g., 20 g glucose in 40 ml water. In other examples, other carbohydrates, such as sucrose, are substituted for glucose.

The pumice block of FIG. 1 is placed in a vacuum vessel and autoclaved at 121° C. and 20 pounds per square inch (psi) for 20 minutes. Immediately afterwards, a vacuum (21.5 inches of mercury or 550 Torr) is pulled on the vacuum vessel until bubbling caused by the removal of air stops. Notably, extending the vacuum too long can result in in too much glucose or other growth promoting agent added to the pumice stone's pores, ultimately causing the cyanobacteria suppression composition to sink in application. After bubbling ceases, the loaded pumice stone porous body is then placed in a drying oven at 37 to 40° C. to remove the water and until the weight fails to change with repeated testing. The final weight for the exemplary cyanobacterial prevention composition is about 5 to 6 grams, but the weight of the cyanobacterial prevention composition in other embodiments might be within a range from, e.g., 0.5 to 500 grams or 1.0 to 100 grams.

In some applications, the invention is used with no further processing. This is desired if a high input of glucose is need immediately to control the HABs/HCB development. However, in most preferred applications, the porous body loaded with the growth promoting agent is covered with a biodegradable wax, e.g., soy wax. The wax is melted, and the loaded pumice stone is covered with the melted soy wax via a method including but not limited to dipping, spraying, brushing, and other controlled application techniques. A single layer of wax to cover the exemplary size cyanobacteria prevention composition of FIG. 1 will add about 0.7 to 0.8 grams to the composition's weight. After this first layer of wax has cooled, additional layers of wax are optionally added by repeating the application process.

Figure 2:
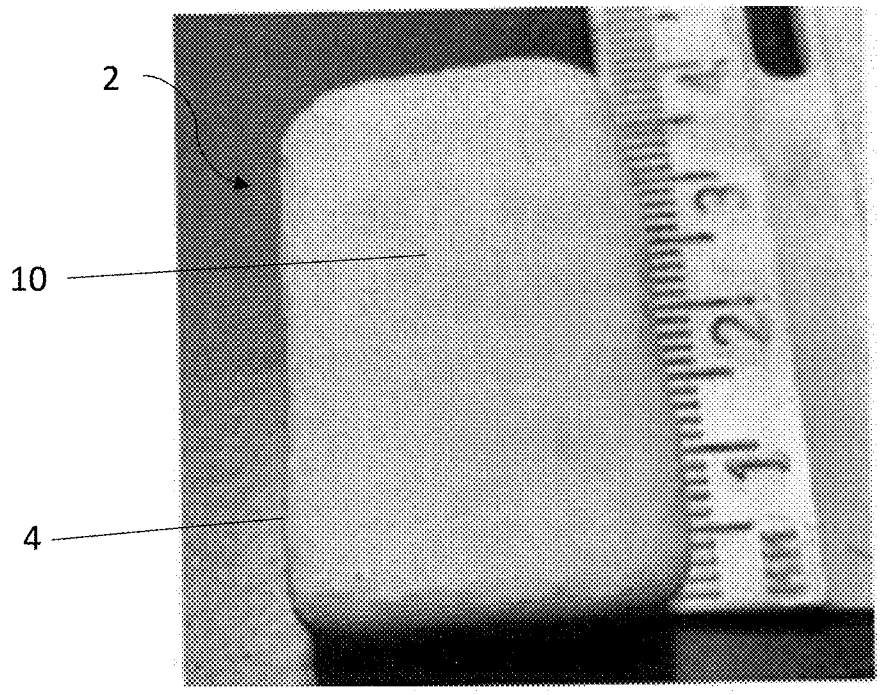
FIG. 2 is a photograph showing an overhead view of an exemplary embodiment of the invention including two layers of biodegradable soy wax coating.

FIG. 2 is a photograph showing an overhead view of an exemplary cyanobacteria suppression composition 2 of a pumice block porous body 4 coated with two layers biodegradable coating 10 in the form of soy wax. The thicker the layer of wax, the slower the growth promoting agent (e.g., glucose) release will occur.

Figure 3:
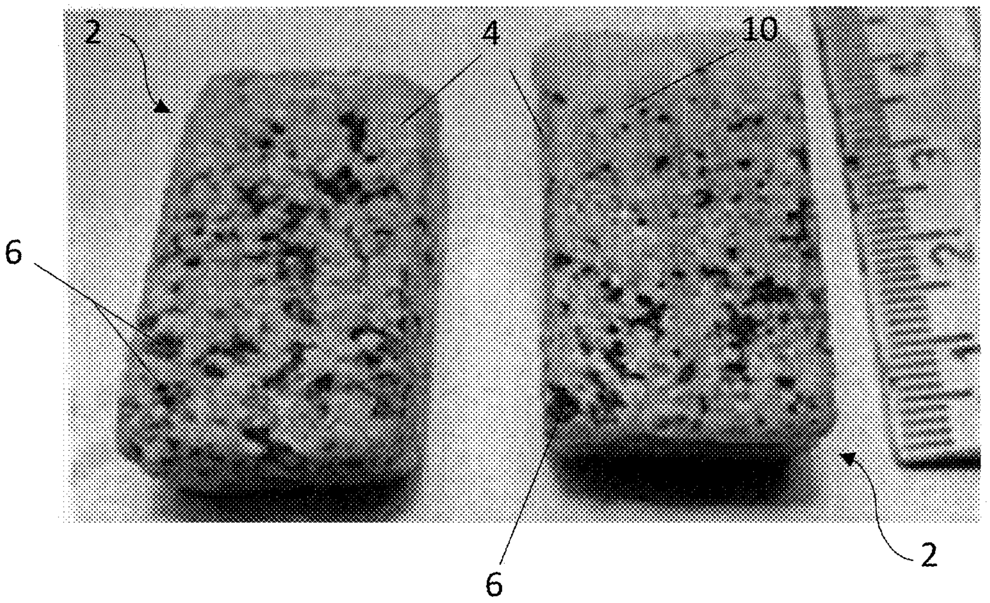
FIG. 3 is a photograph showing an overhead view of two exemplary embodiments of the invention recovered after use in water.

The wax-coated or uncoated growth promoting agent-loaded porous bodies are then added to water of concern to control the HAB/HCB. FIG. 3 is a photograph showing an overhead view of two exemplary embodiments of the cyanobacteria suppression composition 2 recovered after use in water. In these examples, the pumice stone porous body 4 remains, while the majority of the biodegradable coating 10 has since dissolved and the loaded growth promoting agent carbohydrate has been released from the pores 6 of the porous body 4 into the surrounding water.

Figure 4:
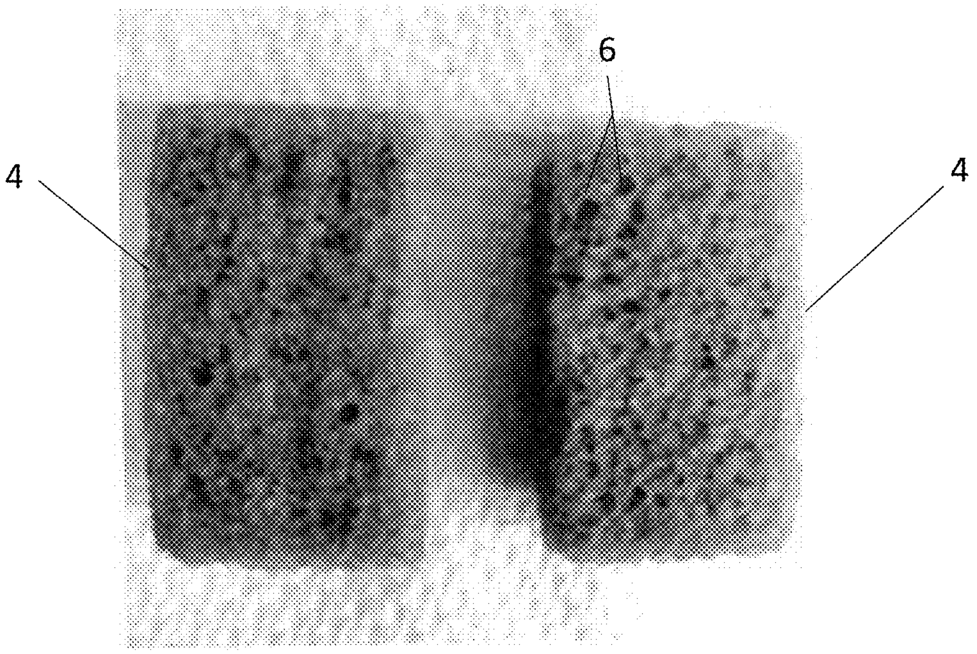
FIG. 4 is a photograph showing an overhead view of two exemplary embodiments of the invention after use and cleaning.

After the cyanobacteria suppression composition 2 have been used, they can be collected by skimming the water surface with nets or with a deployable boom. The recovered floating members are then cleaned in hot-water or steam and then reused. FIG. 4 is a photograph showing an overhead view of two exemplary porous bodies 4 after cleaning, removal of residual growth promoting agent from the pores 6 of each porous body 4, and removal of residual wax biodegradable coating from the porous body 4.

The invention will be illustrated in more detail with reference to the following Examples, but it should be understood that the present invention is not deemed to be limited thereto.

EXAMPLES

Example 1

In one exemplary method of making the invention, a porous body material of pumice stone was first purchased and formed into blocks, e.g., 1×2×3 cm which weighed between approximately 1.5 to 2 grams. Then, a saturated glucose solution was prepared by adding half the weight of glucose as the weight of water, e g., 20 g glucose into 40 ml of water. Next, the pumice blocks were added to a vacuum vessel containing saturated glucose solution. In other non-limiting examples, the vacuum vessel is a side-arm, vacuum flask, or similar vessel. The pumice blocks were autoclaved at 121° C. and 20 pounds per square inch (psi) for 20 minutes. The autoclaved flask containing the pumice blocks was then recovered and a vacuum was pulled at approximately 21.5 inches of mercury or 550 Torr until bubbling was no longer visible. Ceasing the vacuum at the point where bubbling stops allows the glucose to infuse each block but also leave enough air in each block to ensure buoyancy. The glucose-infused pumice blocks were then recovered and placed in a drying oven to remove water. In this nonlimiting example, the oven temperature was between 37-40° C. The length of drying time depends on the size of the porous body. In this example, each 1×2×3 cm pumice block took approximately 2-3 days to dry, and the final weight of each block was between 4-5 grams. Soy wax flakes were then placed in a beaker and melted over a hot plate. The glucose-infused pumice blocks were then dipped into the melted soy wax and cooled with an air stream. In certain examples where a thicker coating is desired, the porous bodies are dipped again into the melted wax and cooled. Each new layer of wax increased the weight of the 1×2×3 cm pumice block by approximately 0.7 to 0.8 grams.

As the biodegradable coating takes time to fully dissolve in the water, the biodegradable coating allows for a controlled release of carbohydrate. Particularly, the controlled release permits the carbohydrate such as glucose to be continuously available to not only initially suppress cyanobacteria growth, but maintain that suppression. After the blocks are cooled, the invention is ready for use. However, when the biodegradable coating is a wax, the finished blocks should be stored away from heat sources to prevent the wax from re-melting.

Prophetic Example 1

In a prophetic exemplary application of the invention to suppress cyanobacterial growth and toxin production, a body of water in question is monitored during the summer bloom season to determine when the cyanobacterial concentration reaches between $1\times10^4$ and $1\times10^5$ cyanobacteria/ml of water. The photosynthetic zone of the body of water is then determined. As impracticalities exist with changing the carbohydrate concentration of the entire body of water, isolating the photosynthetic zone targets the specific volume of water where the cyanobacteria live. In certain examples, the photosynthetic zone is determined using a Secchi disk. Then, the volume of water to be treated within the photosynthetic zone is calculated. A plurality of units of the composition of the invention are then added to the body of water, and the concentration of glucose in the body of water being treated is measured with an instrument such as glucose strips. As the cyanobacteria concentrations in the water are monitored, more blocks of the composition of the invention are added when necessary to maintain a measurable amount of glucose in the water. After all the biodegradable coating and glucose has been released, the porous bodies of the invention remain and are recovered by methods including surface skimming. The porous bodies are then recycled and cleaned with boiling water or steam until any remaining biodegradable coating has released from each porous body. The used porous bodies are then dried prior to being repurposed.

Example 2

Figure 5:
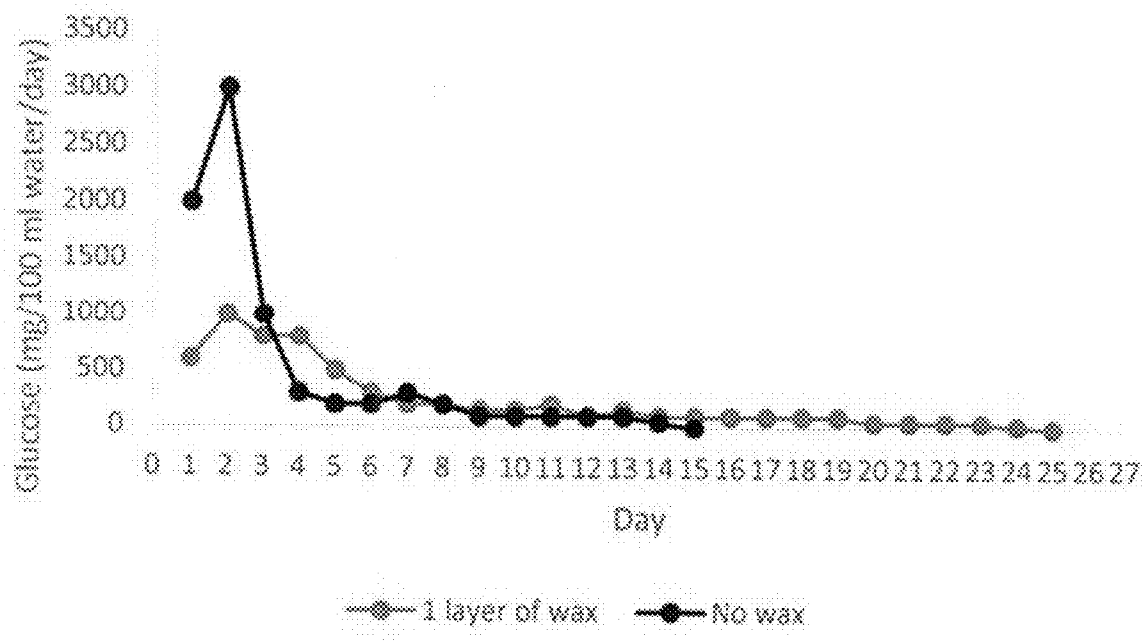
FIG. 5 is a graph showing daily concentration of glucose in 100 ml sterile water treated with exemplary embodiments of the invention including no wax and one layer of wax.

In a demonstration of the controlled release of glucose from a cyanobacteria prevention composition of the invention including one layer of soy wax, 100 ml of sterile, deionized water was added to each of two 250 ml beakers covered with aluminum foil. Two blocks of the composition of the invention were then added to the beakers, the single-wax layer block in one beaker and the other block as a control without the wax layer in the other beaker, and incubated on a rotary shaker at 50 rpms. FIG. 5 is a graph showing daily concentration of glucose in the 100 ml sterile water treated with exemplary embodiments of the invention including no wax and one layer of wax. The concentration of glucose was then measured in each beaker after six hours on day one, then daily using glucose strips. After each daily glucose measurement, the blocks of the composition of the invention were then removed from the beaker, the beaker was rinsed with 100 ml of sterile, deionized water, 100 ml of new sterile, deionized water was added to the beaker, and the blocks were replaced in their respective beakers. As shown by FIG. 5, the cyanobacteria prevention composition of the invention with no wax layer showed very rapid glucose release into the water in the first 6 hours, and by 3 days, much of the glucose had been released with only low levels continuing until day 14. The cyanobacteria prevention composition of the invention with one layer of wax showed a modestly fast release of glucose in the first 6 hours which then increased, plateaued for 3 days, and then gradually declined for the next 3 weeks.

Example 3

Figure 6:
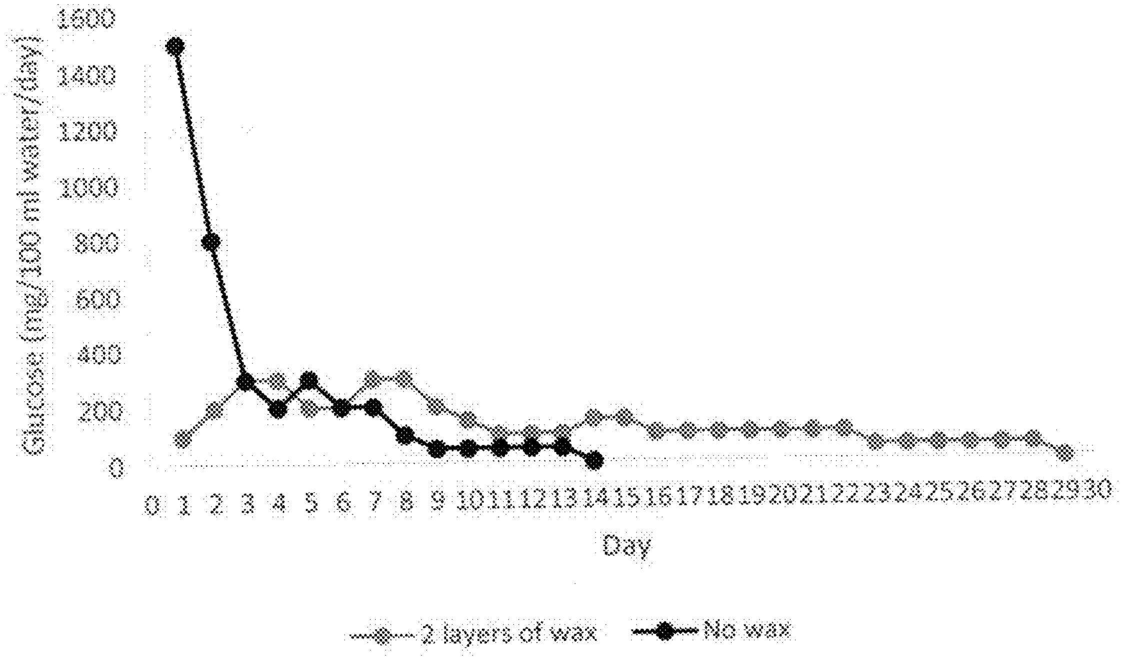
FIG. 6 is a graph showing daily concentration of glucose in 100 ml sterile water treated with exemplary embodiments of the invention including no wax and two layers of wax.

In another demonstration using the composition of the invention, the same method as Example 2 was carried out wherein the block coated with a single layer of wax was replaced with a block coated in two layers of soy wax. FIG. 6 is a graph showing daily concentration of glucose in 100 ml sterile water treated with exemplary embodiments of the invention including no wax and two layers of wax. After the first layer of wax was applied to the glucose-loaded porous body and cooled, the second layer of wax was created by dipping the porous body in melted soy wax and then cooling the entire cyanobacteria prevention composition in an air stream. As shown by the graph, the cyanobacteria prevention composition of the invention containing no wax layer released glucose rapidly into the water at the same rate as recorded in Example 2. The cyanobacteria prevention composition of the invention with two layers of wax showed a consistent release of glucose ranging from 100 to 300 mg/100 ml of water for 28 days.

Example 4

Figure 7:
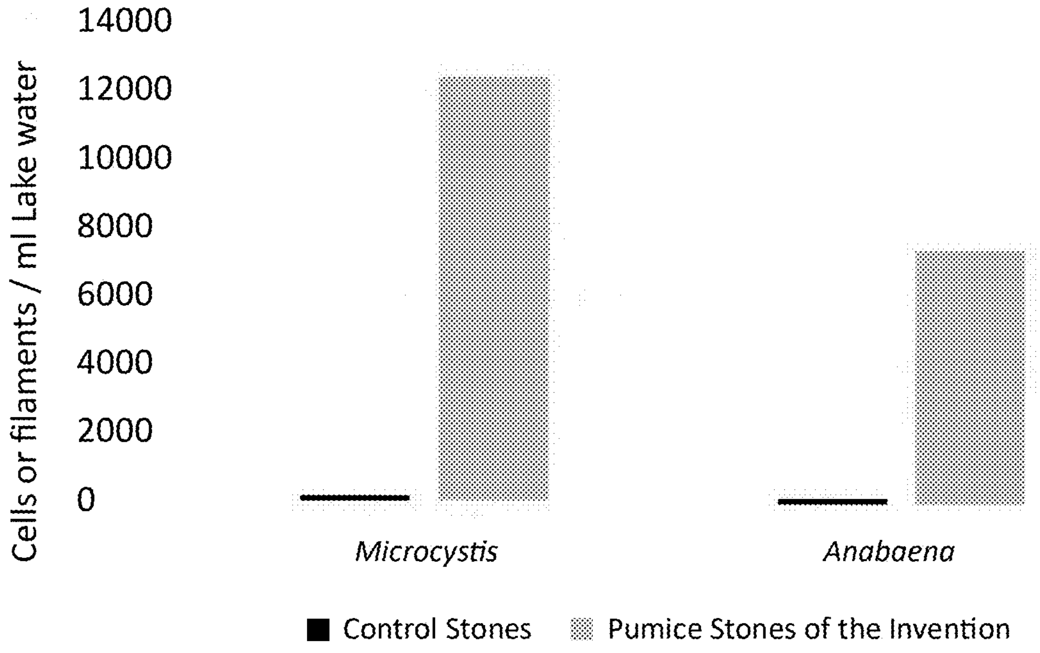
FIG. 7 is a graph showing the results of treatment of 500 ml of lake water with two exemplary embodiments of the invention including one layer of biodegradable coating over twenty days.

An exemplary application of the cyanobacteria suppression composition of the invention was carried out in the laboratory using water collected from a lake prone to HAB/HCB development. To test the invention's ability to suppress cyanobacterial growth, 500 ml of the lake water was added to each of two, 1-liter sterile beakers with stir bars for mixing. Then, four identical pumice stone porous bodies were prepared. Two of the pumice stone porous bodies were prepared as exemplary cyanobacteria suppression compositions of the invention by adding glucose as the suppressor carbohydrate which were then coated with one layer of soy wax each. These two examples of the invention were placed into one of the beakers, called the "Treatment" beaker. The other two pumice stones contained no added glucose or wax layer coating and were added to the other beaker containing 500 ml of lake water, called the "Control" beaker. The beakers were then incubated in a Panasonic light chamber at 25° C. with 16 hours of light and 8 hours of darkness. Each beaker was mixed for 5 minutes daily on a stir plate. After 20 days of incubation, the concentrations of the cyanobacteria *Microcystis* and *Anabaena* were determined using a Cellometer® counting slide, following the Cellometer® manufacturer's instructions. FIG. 7 is a graph showing the results after the 20-day treatment of 500 ml of lake water in the "Treatment" beaker compared to the water in the "Control" beaker. After 20 days, the "Control" beaker water contained the cyanobacteria *Microcystis* and *Anabaena* at $1.25\times10^4$ cells/ml or at $0.75\times10^4$ filaments/ml water, respectively. But *Microcystis* and *Anabaena* were undetected in the "Treatment" beaker water. These results indicate that the examples of the composition of the invention suppressed the growth of the cyanobacteria.

While the invention has been described in detail and with reference to specific examples thereof, it will be apparent to one skilled in the art that various changes and modifications can be made therein without departing from the spirit and scope thereof.

REFERENCES

1. Asgodom, M. E.; Liu, D.; Fu, H.; Xie, H.; Kong, J. Effect of the near-infrared activated photocatalyst Cu(2)(OH)PO (4) nanoparticles on the growth of harmful algal blooms causing *Microcystis aeruginosa*. Environ. Sci. Pollut. Res. Int. 2021, 28 (16), 20762-20771.

2. Buley. R. P.; Adams, C.; Belfiore, A. P.; Fernandez-Figueroa, E G.; Gladfelter, M. F.; Garner, B.; Wilson, A. E. Field evaluation of seven products to control cyanobacterial blooms in aquaculture. Environ. Sci. Pollut. Res. Int. 2021, 128 (23), 29971-29983.
3. Kinley-Baird, C.; Calomeni, A.; Berthold, D. E.; Lefler, F. W.; Barbosa, M.; Rodgers, J. H.; Laughinghouse, H. D. Laboratory-scale evaluation of algaecide effectiveness for control of microcystin-producing cyanobacteria from Lake Okeechobee, Florida (USA) Ecotoxicol Environ Saf. 2020, 207, 11233. doi: 10.1016/j.ecoenv.2020.111233.
4. Chen, C.; Wang, Y.; Chen, K., Shi, X.; Yang, G. Using hydrogen peroxide to control cyanobacterial blooms: A mesocosm study focused on the effects of algal density in Lake Chaohu, China. Environ. Pollut. 2021, 272, 115923. doi: 10.1016/j.envpol.2020.115923.
5. Mucci, N.; Dugheri, S.; Bonari, A.; Farioli, A.; Rapisarda, V.; Garzaro, G.; Cappelli, G.; Arcangeli, G. Health risk assessment related to hydrogen peroxide presence in the workplace atmosphere—analytical methods evaluation for an innovative monitoring protocol. Int. J. Occup Med. Environ. Health. 2020, 33 (2), 137-150.
6 Mirzaei VandKhanghah, M.; Hedayati, A.; Nazeri, S.; Mohammadi Azarm, H.; Ghorbani, R. Biomagnification of copper along the aquatic food chain (Artemia franciscana. *Danio rerio*. and *Astronotus ocellatus*). Biol. Trace Elem. Res. 2021, doi: 10.1007/s12011-021-02781-4
7. Vesper S, Sienkiewicz N, StruewingI, Linz D, Lu J. Prophylactic addition of glucose suppresses cyanobacterial abundance in lake water. Life. 2022; 12, 385. doi: 10.3390/life12030385.
8. Carmichael, W W. Health effects of toxin-producing cyanobacteria: The CyanoHABS. Hum. Ecol. Risk Assess. Int. J. 2001, 7, 1393-1407.
9. Amorim, C. A., Moura, A. D. N. Ecological impacts of freshwater algal blooms on water quality, plankton biodiversity, structure and ecosystem functioning. Sci. Total Environ. 2021, 758, 143605 doi: 10.1016/j.scitotenv.2020.143605.
10. Olson, N. E., Cooke. M E.; Shi, J. H.; Birbeck, J. A.; Westrick, J. A.; Ault. A. P. Harmful algal bloom toxins in aerosol generated from inland lake water. Environ. Sci. Techno!. 2020, 54 (8), 4769-4780.

What is claimed is:

1. A cyanobacteria suppression composition comprising:

a porous body comprising a plurality of pores;

a growth promoting agent loaded into the pores of the porous body; and a biodegradable coating at least partially surrounding an exterior surface of the porous body loaded with the growth promoting agent, wherein:

the biodegradable coating is effective to delay a release of the growth promoting agent from the porous body upon exposure to water;

the porous body loaded with the growth promoting agent and at least partially coated with the biodegradable coating is buoyant in water; and the growth promoting agent is effective to promote growth of microorganisms that compete with cyanobacteria for resources so as to be effective to suppress growth of the cyanobacteria in a body of water upon addition of the cyanobacteria suppression composition to the body of water.

2. The cyanobacteria suppression composition of claim 1, wherein the porous body comprises a natural material selected from the group consisting of a pumice stone, wood chips and a sponge.

3. The cyanobacteria suppression composition of claim 1, wherein the growth promoting agent is non-toxic and occupies less than 100% of a total volume of the pores of the porous body.

4. The cyanobacteria suppression composition of claim 3, wherein the growth promoting agent is a carbohydrate.

5. The cyanobacteria suppression composition of claim 1, wherein the growth promoting agent is a carbohydrate selected from the group consisting of glucose, fructose and sucrose.

6. The cyanobacteria suppression composition of claim 1, wherein the biodegradable coating is a plant-based wax or a beeswax.

* * * * *